United States Patent
Yokota (10) Patent No.: US 6,614,929 B1
(45) Date of Patent: Sep. 2, 2003

(54) APPARATUS AND METHOD OF DETECTING CHARACTER WRITING AREA IN DOCUMENT, AND DOCUMENT FORMAT GENERATING APPARATUS

(75) Inventor: Kazuaki Yokota, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/533,593

(22) Filed: Mar. 23, 2000

(30) Foreign Application Priority Data

Feb. 28, 2000 (JP) ........................................ 2000-050957

(51) Int. Cl.[7] .................................................. G06K 9/34
(52) U.S. Cl. ......................... 382/175; 382/282; 358/453
(58) Field of Search ................................. 382/175, 176, 382/179, 282, 283; 358/464, 453; 707/505

(56) References Cited

U.S. PATENT DOCUMENTS

| | | | | |
|---|---|---|---|---|
| 5,140,650 A | * | 8/1992 | Casey et al. ................. | 382/176 |
| 5,182,656 A | * | 1/1993 | Chevion et al. ............. | 382/283 |
| 5,631,984 A | * | 5/1997 | Graf et al. ................... | 382/317 |
| 5,694,494 A | * | 12/1997 | Hart et al. ................... | 382/175 |
| 6,137,905 A | * | 10/2000 | Takaoka ....................... | 382/173 |

FOREIGN PATENT DOCUMENTS

JP  10-040312  2/1998

* cited by examiner

*Primary Examiner*—Amelia M. Au
*Assistant Examiner*—Colin LaRose
(74) *Attorney, Agent, or Firm*—Finnegan, Henderson, Farabow, Garrett & Dunner, L.L.P.

(57) ABSTRACT

An apparatus for detecting a character writing area inputs a plurality of images of written documents respectively having different characters recorded thereon to an existing document. The apparatus produces a common image and a differential image, based on the input images. By using of the common image and the differential image, a character-writing-areas are detected and an attribute is set for each of the areas. A format used for the written document is produced by using of the character-writing-areas and set attributes.

8 Claims, 5 Drawing Sheets

| ITEM CHARACTERS | CHARACTER TYPES |
|---|---|
| ADDRESS | KANJI CHARCTERS, JAPANESE SYLLABARY CHARACTERS, KATAKANA CHARACTERS, NUMERALS, 〒 |
| NAME | KANJI CHARCTERS, JAPANESE SYLLABARY CHARACTERS, KATAKANA CHARACTERS |
| AGE | NUMERALS |
| MONEY | NUMERALS, YEN, ¥ |
| NUMBER | NUMERALS |
| SYMBOL | NUMERALS, ALPHABETS, KATAKANA CHARACTERS |
| OTHER | ALL CHARACTER TYPES |

APPARATUS AND METHOD OF DETECTING CHARACTER WRITING AREA IN DOCUMENT, AND DOCUMENT FORMAT GENERATING APPARATUS

CROSS-REFERENCE TO RELATED APPLICATIONS

This application is based upon and claims the benefit of priority from the prior Japanese Patent Application No. 2000-050957, filed Feb. 28, 2000, the entire contents of which are incorporated herein by reference.

BACKGROUND OF THE INVENTION

The present invention relates to a technique of detecting a character writing area in an existing document to be scanned by an optical character reader or an optical character recognize (hereinafter called "OCR") and setting a format in the target existing document.

Recently, there increasing needs for reading characters written on existing documents by means of an OCR.

To scan an existing document which is not exclusively designed to be read by an OCR, it is necessary to previously register format control data (FC data) in that OCR as the format for that document. This FC data is registered by registering positional information (coordinate data of a character writing area (which is enclosed by ruled lines) on the document and attributes, such as the type and font of characters to be written in that area, and whether they are handwritten written or typed. Writing in this specification includes both hand-writing of characters and printing of characters by a printer or the like.

Jpn. Pat. Appln. KOKAI Publication No. 10-40312 discloses a technique of acquiring an unfilled document image by taking a logical product of a plurality of written document images respectively having different characters written thereon.

This technique could not however detect a character writing area set on a document. Neither could it detect the character type which is one of the attributes of characters to be written in the detected character writing area.

BRIEF SUMMARY OF THE INVENTION

Accordingly, it is an object of the present invention to provide an apparatus and method of detecting a character writing area in an existing document, a recording medium and a document format producing apparatus.

To achieve the above object, according to one aspect of this invention, there is provided an apparatus for detecting a character writing area in a document, which comprises image input means for inputting a plurality of images of written documents respectively having different characters recorded thereon to a document previously provided with ruled lines and a character writing area where characters are to be recorded; image processing means for producing a common image common to the plurality of images and a differential image acquired by performing a logical sum of mutually different images in the plurality of images, based on the plurality of images input by the image input means; and character-writing-area detection means for detecting the character writing area based on the common image and the differential image produced by the image processing means.

This structure can allow a character writing area in an existing document to be detected.

According to another aspect of this invention, there is provided a document format producing apparatus which comprises image input means for inputting a plurality of images of written documents respectively having different characters recorded thereon to a document provided with ruled lines and a character writing area where characters are to be recorded; image processing means for producing a common image common to the plurality of images and a differential image acquired by performing a logical sum of mutually different images in the plurality of images, based on the plurality of images input by the image input means; character-writing-area detection means for detecting the character writing area based on the common image and the differential image produced by the image processing means; attribute setting means for setting attributes for the detected character writing area based on the common image and the differential image produced by the image processing means; and format setting means for setting positional information of the detected character writing area and the set attributes as format control information of the written documents in association with each other.

This structure can permit a document format to be set for an existing document.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will now be described with reference to the accompanying drawings.

Figure 1:
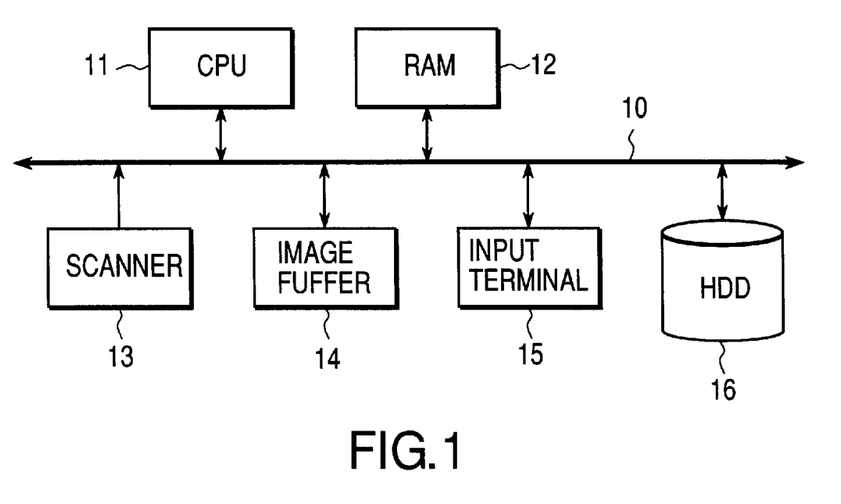
FIG. 1 is a diagram illustrating the schematic structure of a system according to one embodiment of this invention.

FIG. 1 is a system diagram illustrating the overall system of a document format setting apparatus according to this invention. Connected to a system bus 10 are a CPU 11, RAM 12, scanner 13, image buffer 14, input terminal 15 and magnetic disk drive (HDD) 16.

The CPU 11 loads a control program stored in the HDD 16 into the RAM 12 and runs it to perform the general control of the system.

The scanner 13 scans a document image and inputs the image into the system. The image buffer 14 is used as a working area of temporarily retaining the document image input from the scanner 13 and images to be processed at the time of executing image processing. The input terminal 15 comprises a display device, such as a CRT, and an input device, such as a keyboard and a mouse.

Figure 2:
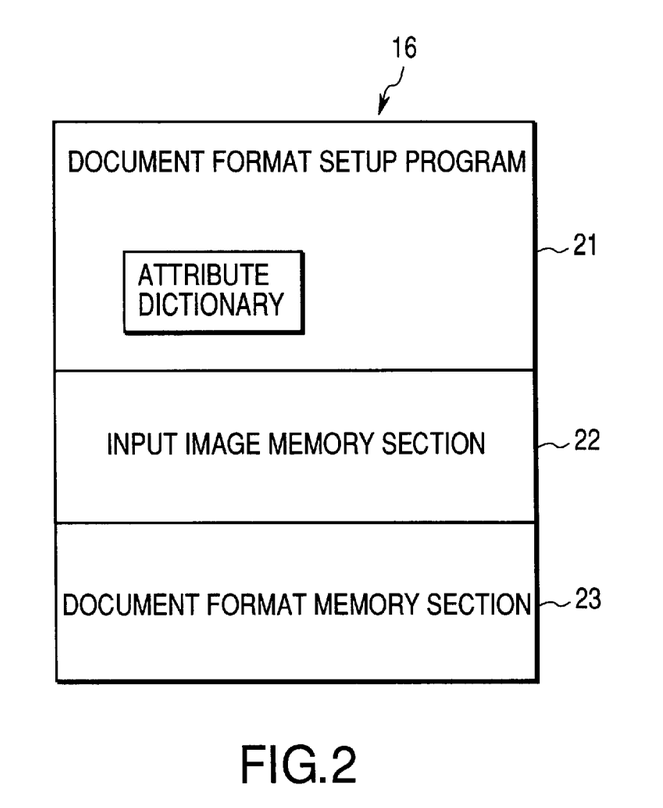
FIG. 2 is a diagram showing the structures of a program, etc. recorded on a hard disk drive 16.

The HDD 16 stores a program, data and images. As shown in FIG. 2, the HDD 16 is provided with a document format setting program 21 which achieves this invention, an input image memory section 22 which holds a document image to be subjected to image processing for setting the document format and a document format memory section 23 which stores the set document format data. The document format setting program 21 includes an attribute dictionary.

Figure 5:
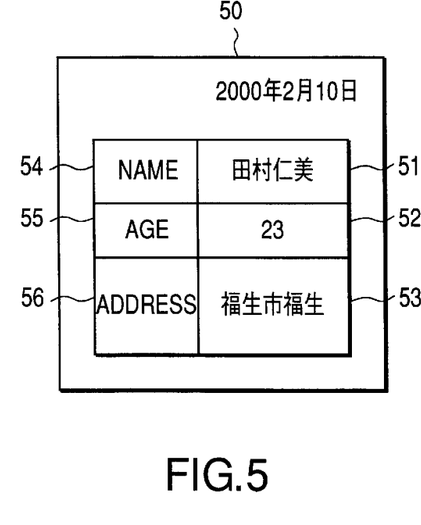
FIG. 5 is a diagram depicting the image of an existing document.
Figure 6:
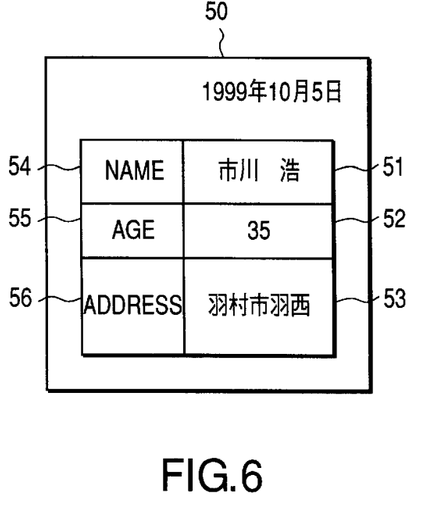
FIG. 6 is a diagram depicting the image of another existing document.

The operation of this invention will now be discussed in detail referring to the flowchart shown in FIG. 3. This invention is achieved by loading the document format setting program 21 stored in the HDD 16 into the RAM 12 and causing the CPU 11 to run the program. This embodiment of the invention will be described below with reference to the case where document format data is so set as to allow an existing document 50 as shown in FIGS. 5 and 6 to be subjected to character recognition by an OCR. The existing documents 50 shown in FIGS. 5 and 6 each contain entry columns 51, 52 and 53 to write a name, age and address. The existing document 50 further includes item-name columns 54, 55 and 56 having three item names, name, age and address, pre-printed thereon. Those entry columns and item-name columns are separated by ruled lines. Further, "年(Year)", "月(Month)" and "日(Day)" are pre-printed at the upper right portion of the existing document 50 so that the date this document is or was prepared can be entered.

First, a plurality of images of written existing documents as shown in FIGS. 5 and 6 are input via the scanner 13 (step S30). The document images input through the scanner 13 are temporarily retained in the image buffer 14, and are then saved in the input image memory section 22 in the HDD 16. The proper number of images to be input would be about 100 to 1000 which can be adequately selected. If a plurality of document images have been retained previously, the images may be saved directly in the input image memory section 22 of the HDD 16.

Next, collation is performed on those input document images (step S31). The operation of this collation will be discussed by referring to the flowchart illustrated in FIG. 4.

Figure 4:
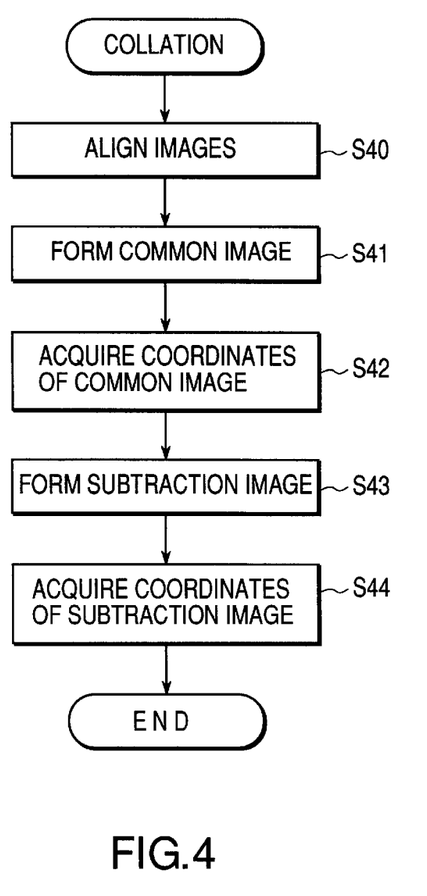
FIG. 4 is a detailed flowchart showing step S31 in FIG. 3.
Figure 7:
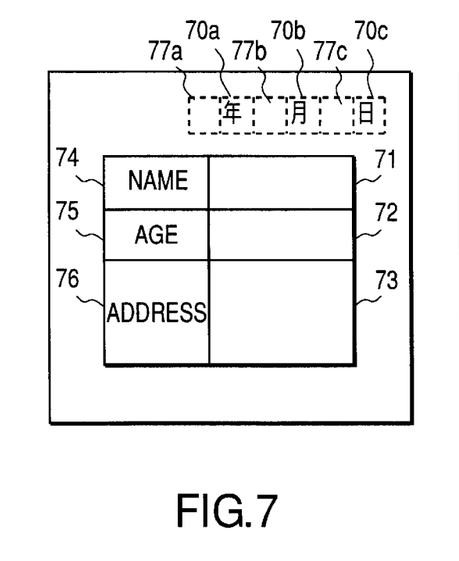
FIG. 7 is a diagram showing a common image.

First, the plurality of input document images are aligned through image processing (step S40). Then, a common image is produced based on the aligned document images (step S41). The generation of the common image is carried out in the following manner. The number of black bits is measured pixel by pixel based on the individual aligned document images. Each pixel is digitized by comparing the measured number of black bits with a predetermined threshold value. Specifically, those pixels whose numbers of black bits are greater than the threshold value are determined as "black" while those pixels numbers of black bits are smaller than the threshold value are determined as "white". The adequate threshold value would be a numeral which is about 90% of the number of, for example, the input images of written documents. This digitization can provide an image common to the plurality of written document images that have been input. FIG. 7 shows this produced common image.

Next, the coordinate data of the prepared common image is acquired (step S42). Specifically, ruled lines are detected from the image shown in FIG. 7, and the coordinate data of ruled-line areas 71, 72, 73, 74, 75 and 76 each enclosed by ruled lines are acquired. If the common image is not enclosed by ruled lines, rectangular areas 70a, 70b and 70c which contain that image are determined and the coordinate data of the rectangular areas are acquired. Because those image portions in the common image which correspond to the item characters "Address", "Name" and "Age" are not enclosed by ruled lines, their coordinate data will not be obtained.

Figure 8:
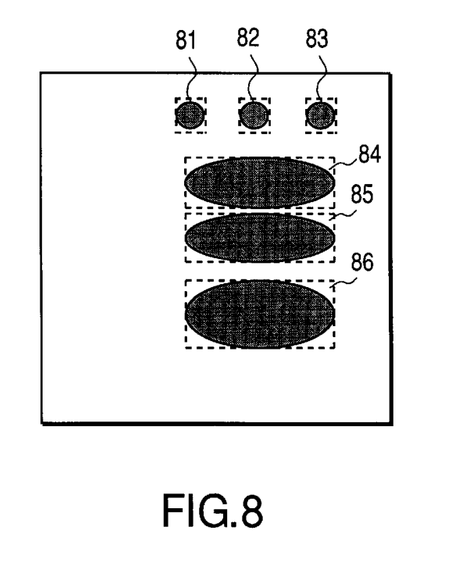
FIG. 8 is a diagram showing a differential image.

Then, based on the aligned document images, a logical sum is performed on mutually different images to produce a differential image (step S43). The differential image is acquired as follows. First, paying attention to the pixel that has been determined as "white" in the above-described digitization, the individual pixels are expressed by the gray scale in accordance with the measured number of black bits at the position of the pixel of interest in each input image. FIG. 8 shows the document image that is expressed by the gray scale. The image shown by the gray scale in FIG. 8 is the differential image that has been prepared by performing a logical sum on mutually different images in the plurality of input images. Then, rectangular areas 81, 82, 83, 84, 85 and 86 which contain the differential image as shown in FIG. 8 are detected and their coordinate data are acquired (step S44). The collation (step S30) whose essential processes are those steps S41 and S44 is equivalent to the image processing means in this invention.

Figure 3:
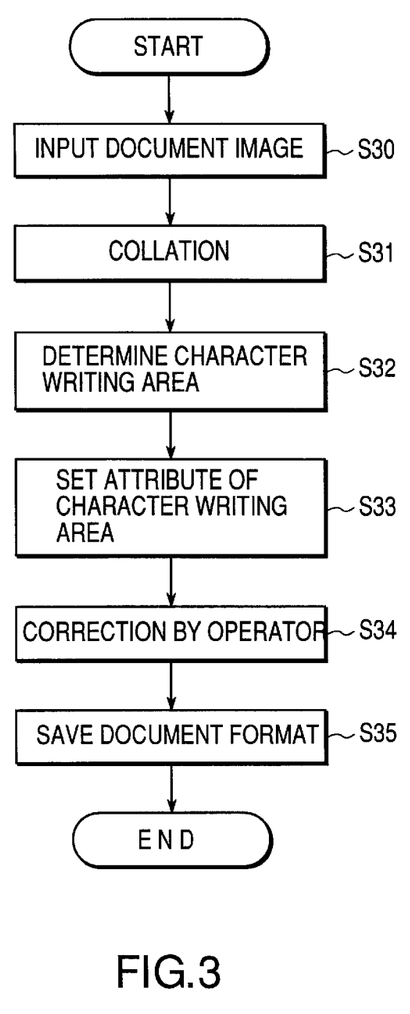
FIG. 3 is a flowchart for explaining the operation of this invention.

The above completes the collation, after which the flow returns to step S32 in the flowchart in FIG. 3 to determine a character writing area on the existing document 50. A character writing area where characters to be scanned is determined by comparing the coordinate data of the produced common image with that of the differential image. In the case shown in FIGS. 7 and 8, a character writing area is determined by comparing the coordinate data of the ruled-line areas 71, 72, 73, 74, 75 and 76 with those of the rectangular areas 81, 82, 83, 84, 85 and 86.

When there is a rectangular area contained in the coordinate range of a ruled-line area, that ruled-line area is determined as a character writing area. Because the rectangular area 84 is contained in the coordinate range of the ruled-line area 71, for example, the ruled-line area 71 is determined as a character writing area. Likewise, the ruled-line areas 72 and 73 are determined as character writing areas.

With regard to the rectangular areas 70a and 70b which contain images not enclosed by ruled lines, it is determined if they are character writing areas based on whether or not any of the rectangular areas 81, 82, 83, 84, 85 and 86 is adjoining to the areas 70a and 70b. As the rectangular area 70a is adjacent to the rectangular area 81, a rectangular area 77a (equivalent to the rectangular area 81) adjacent to the rectangular area 70a is determined as a character writing area. Similarly, the rectangular areas 77b and 77c are also determined as character writing areas.

Figure 9:
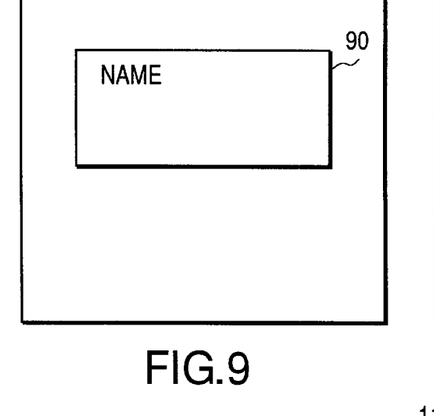
FIG. 9 is a diagram showing another example of a differential image.
Figure 10:
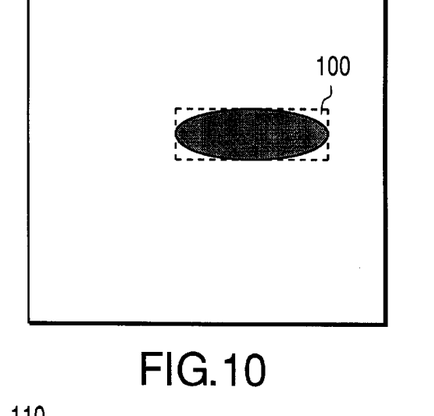
FIG. 10 is a diagram showing another example of a common image.

Some documents may have item names provided in character writing areas enclosed by ruled lines. In such a case, for example, a common image is formed as shown in FIG. 9 and a differential image is produced as shown in FIG.

10. In this case, as the coordinates of a rectangular area 100 lie in the coordinate range of a ruled-line area 90, the ruled-line area 90 is determined as a character writing area. The above-described process in this step S32 of determining a character writing area is equivalent to the character-writing-area detection means of this invention.

Then, the flow proceeds to step S33 to set the attributes of the character writing area that has been determined in the step S32. The attributes are used at the time the OCR performs character recognition and define the type of characters to be recognized, whether they are hand-written or typed, the font and so forth. If the attributes are previously defined as format data in a character writing area, the OCR carries out the subsequent character recognition procedures, considering the character pattern to be subjected to character recognition obtained from that character writing area as the defined character type. When character recognition is implemented by computing a similarly between the input character pattern and a standard pattern, for example, computation of similarities with the standard patterns of all the character types are unnecessary. This can speed up the recognition process and does not result in erroneous character recognition, thus contributing to the improvement of the recognition rate or hit rate.

In setting the attributes of a character writing area, first, those image portions in the above-described common image which are other than ruled lines are recognized to acquire item characters. In the case of the common image shown in FIG. 7, the item characters "年(Year)", "月(Month)", "日(Day)", "Address", "Name" and "Age" are recognized.

Figure 11:
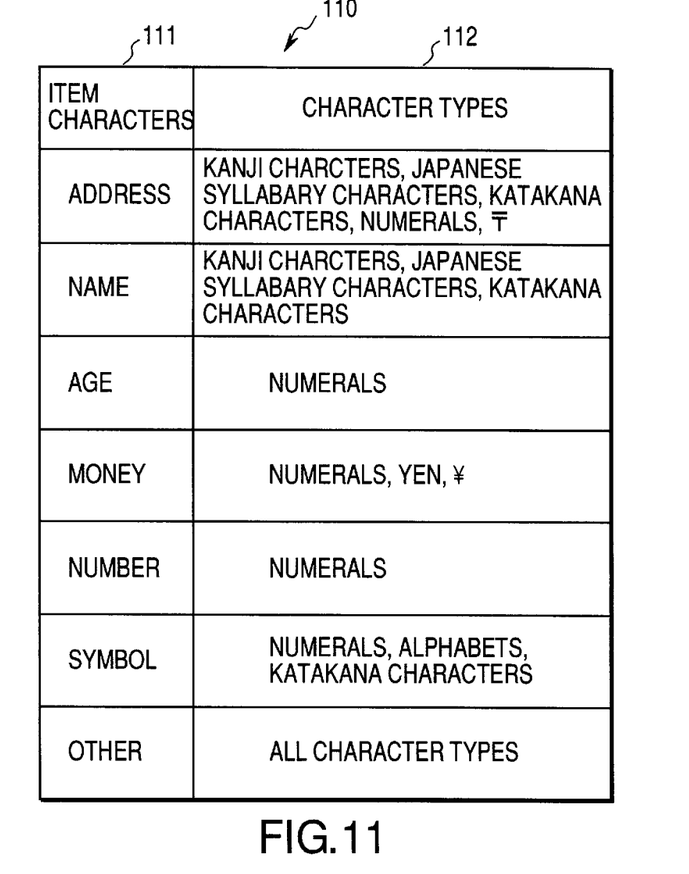
FIG. 11 is a diagram illustrating the structure of an attribute dictionary.

Then, the attributes of the character writing areas corresponding to those item characters are defined by referring to the attribute dictionary. It is to be noted that the attribute dictionary has character types defined as attribute data as shown in FIG. 11. In FIG. 11, an attribute dictionary 110 has item characters 111 defined in association with character types 112 which are one type of the attributes. For example, the character types "Kanji characters, Japanese syllabary characters, Katakana characters, Numerals, 年(symbol for the postal code)" are defined for the item characters "Address". Likewise, the attribute "Numeral" is defined for the item characters "Age". The attribute data corresponding to item characters can be acquired by referring to the thus defined attribute dictionary 110 based on the result of recognition of the recognized item characters.

The attributes are defined as follows based on the attributes acquired by referring to the attribute dictionary. "Kanji characters, Japanese syllabary characters, Katakana characters, Numerals, 年" are defined as the character types as the attributes of the ruled-line area 71 which is a character writing area adjoining to the position where the item characters "Address" is provided in FIG. 7. Further, "Kanji characters, Japanese syllabary characters, Katakana characters" are defined as the character types as the attributes of the ruled-line area 73 which is a character writing area adjoining to the position where the item characters "Age" is provided. Such attribute definition is accomplished by combining the attribute data of a ruled-line area with attribute data. The above-described process in this step S33 of setting the attributes of a character writing area is equivalent to the attribute setting means of this invention.

Figure 12:
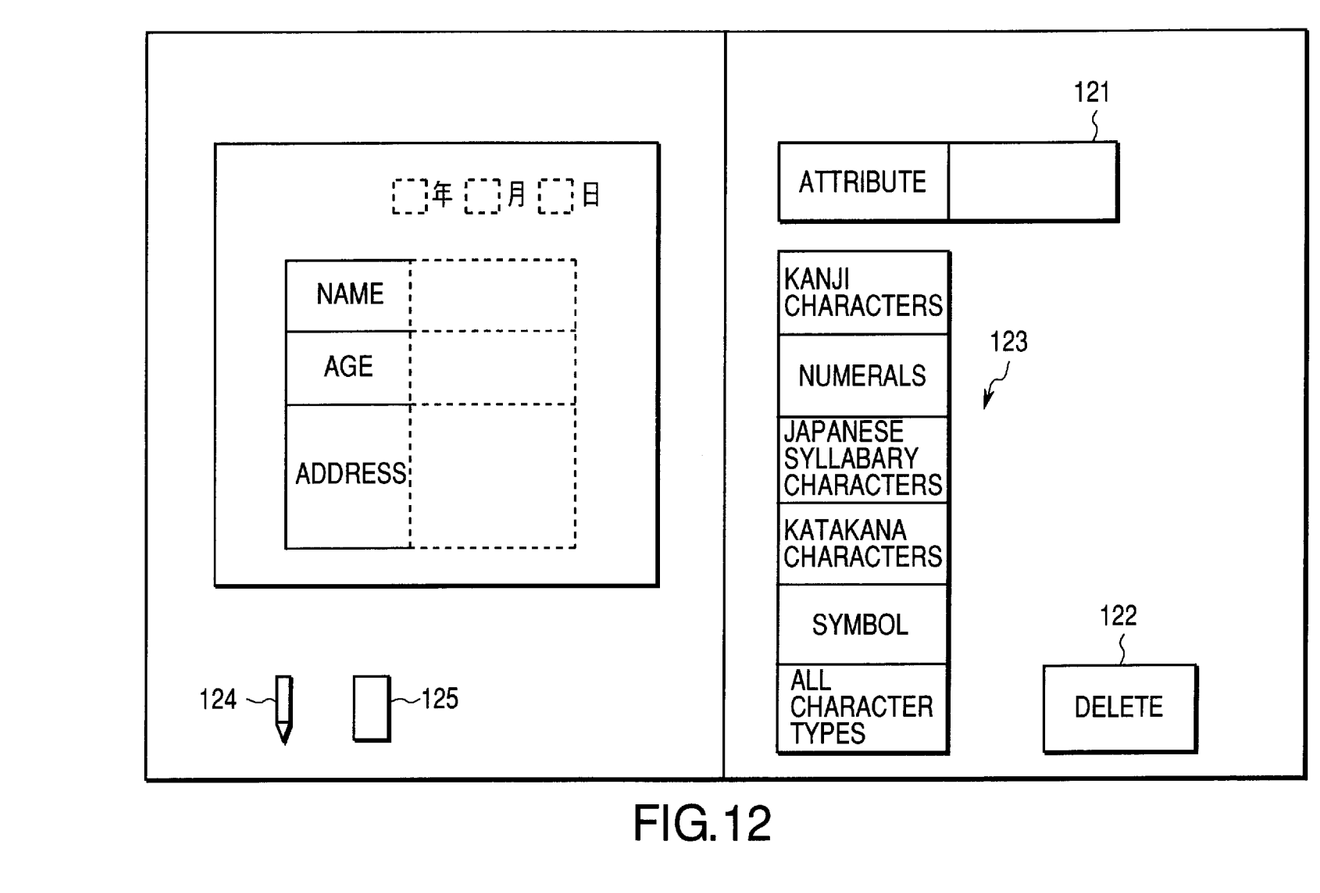
FIG. 12 is a diagram exemplifying what is displayed on the screen of an input terminal.

Then, the flow proceeds to step S34 to a character writing areas acquired by the operator by the previous step S33 and the attributes set in those character writing areas are corrected using the input terminal 15. FIG. 12 shows the screen to be displayed on the display device of the input terminal 15 at the time this correction is carried out. The screen shown in FIG. 12 is separated into the right and left sections, the left-hand area displaying the common image and character writing areas acquired by the previous step. The left-hand area shows the character writing areas enclosed by broken lines; ruled lines shown by solid lines indicate simple ruled lines. It is to be noted that the actual screen should distinguish the character writing areas from the ruled lines by different colors. The right-hand area shows an attribute-display area 121 which gives the defined attributes.

Clicking an illustrated character writing area with the mouse, the operator checks, on the right-hand side of the screen, the attributes set in that character writing area. FIG. 12 shows the defined attributes in the attribute-display area 121. To delete any defined attribute, the operator should specify the defined attribute character with the mouse and then click a delete button 122. To add an attribute, the attribute to be defined should be selected from attribute icons 123 and dragged and dropped in the attribute-display area 121. To add/delete a character writing area, the operator should click a pencil icon 124 or an erasure icon 125 on the left-hand side of the screen with the mouse, draw or erase ruled lines within the range specified by the mouse and input item characters at the positioned designated by the mouse using the keyboard. If a character writing area is added, its attributes should be set in the above-described manner. Although the detailed description will not be given, as attributes, other fonts than the character types, designation of whether characters to be scanned are hand-written or typed, the designation of the type of the recognition process at the time of carrying out character recognition, and other attributes are set when this correcting process is executed.

The corrected character writing areas and attributes are saved as format control data in the document format memory section 23 on the HDD 16 (step S35). The above-described process in the step S35 of saving the document format is equivalent to the format setting means of this invention.

The recording medium in this invention can take any form of storage, such as a magnetic disk, floppy disk, optical disk (CD-ROM, CD-R, DVD, etc.), magneto-optical disk (MO, etc.), or a semiconductor memory, as long as it can store a program and is readable by a computer. Further, some of the individual processes which achieve this embodiment may be performed by middleware (MW), such as an operating system or database management software which runs on a computer based on commands given by a program which is loaded from the recording medium and installed on that computer. Furthermore, the recording medium in this invention is not limited to a medium dependent of a computer but includes a recording medium which stores or temporarily retains a program downloaded over LAN, the Internet or the like. The number of the recording media is not limited to one, but this invention should embrace the case where the process according to this embodiment may be executed from a plurality of media, which can take any structure.

The computer in this invention simply executes the individual processes in this embodiment based on the program stored in the recording medium, so that the computer may be a single unit such as a personal computer, or a system which has a plurality of units connected together over a network. The computer in this invention is not limited to a personal computer, but includes an arithmetic operation unit, microprocessor or the like included in an information processing device, and is a general expression of machines and devices which can accomplish the functions of this invention based on a program.

According to this invention, as described above, collation of a plurality of images of written documents can ensure high-precision detection of character writing areas in a document and can allow the attributes of any detected character writing area to be set. As means for correcting the character writing area and its attributes is provided, it is possible to set the optimal document format.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for detecting a character writing area in a document, comprising:

image input means for inputting a plurality of images of written documents respectively having different characters recorded thereon to a document provided with ruled lines and a character writing area where characters are to be recorded;

image processing means for producing a common image common to said images and a differential image acquired by performing a logical sum of mutually different images in said images, based on said images input by said image input means; and character-writing-area detection means for detecting said character writing area based on said common image and said differential image produced by said image processing means, wherein said character-writing-area detection means includes:

means for detecting a ruled-line area enclosed by said ruled lines in said common image;

means for detecting a rectangular area containing said differential image; and means for recognizing said detected ruled-line area as said character writing area when said rectangular area is included in said detected ruled-line area.

2. An apparatus for detecting a character writing area in a document, comprising:

image input means for inputting a plurality of images of written documents respectively having different characters recorded thereon to a document provided with ruled lines and a character writing area where characters are to be recorded;

image processing means for producing a common image common to said images and a differential image acquired by performing a logical sum of mutually different images in said images, based on said images input by said image input means; and character-writing-area detection means for detecting said character writing area based on said common image and said differential image produced by said image processing means, wherein said character-writing-area detection means includes:

means for detecting a first rectangular area containing that part of said common image which is located in an area which is not enclosed by said ruled lines;

means for detecting a second rectangular area containing said differential image; and means for recognizing said second rectangular area as said character writing area when said detected first rectangular area is adjacent to said detected second rectangle area.

3. A method of detecting a character writing area in a document, comprising the steps of:

inputting a plurality of images of written documents respectively having different characters recorded thereon to a document provided with ruled lines and a character writing area where characters are to be recorded;

producing a common image common to said plurality of images and a differential image acquired by performing a logical sum of mutually different images in said plurality of images, based on said plurality of images input by said image input step; and detecting said character writing area based on said produced common image and differential image, wherein said character-writing-area detection step includes the steps of:

detecting a ruled-line area enclosed by said ruled lines in said common image;

detecting a rectangular area containing said differential image; and recognizing said detected ruled-line area as said character writing area when said rectangular area is included in said detected ruled-line area.

4. A method of detecting a character writing area in a document, comprising the steps of:

inputting a plurality of images of written documents respectively having different characters recorded thereon to a document provided with ruled lines and a character writing area where characters are to be recorded;

producing a common image common to said plurality of images and a differential image acquired by performing a logical sum of mutually different images in said plurality of images, based on said plurality of images input by said image input step; and detecting said character writing area based on said produced common image and differential image, wherein said character-writing-area detection step includes the steps of:

detecting a first rectangular area containing that part of said common image which is located in an area which is not enclosed by said ruled lines;

detecting a second rectangular area containing said differential image; and recognizing said second rectangular area as said character writing area when said detected first rectangular area is adjacent to said detected second rectangular area.

5. A computer-readable recording medium where a program for operating a computer is stored, said program comprising:

means for inputting a plurality of images of written documents respectively having different characters recorded thereon to a document provided with ruled lines and a character writing area where characters are to be recorded;

means for producing a common image common to said plurality of images and a differential image acquired by performing a logical sum of mutually different images in said plurality of images, based on said plurality of images input by said image input means; and means for detecting said character writing area based on said produced common image and differential image, wherein said character-writing-area detection means includes:

means for detecting a ruled-line area enclosed by said ruled lines in said common image;

means for detecting a rectangular area containing said differential image; and means for recognizing said detected ruled-line area as said character writing area when said rectangular area is included in said detected ruled-line area.

6. A computer-readable recording medium where a program for operating a computer is stored, said program comprising:

means for inputting a plurality of images of written documents respectively having different characters recorded thereon to a document provided with ruled lines and a character writing area where characters are to be recorded;

means for producing a common image common to said plurality of images and a differential image acquired by performing a logical sum of mutually different images in said plurality of images, based on said plurality of images input by said image input means; and means for detecting said character writing area based on said produced common image and differential image, wherein said character-writing-area detection means includes:

means for detecting a first rectangular area containing that part of said common image which is located in an area which is not enclosed by said ruled lines;

means for detecting a second rectangular area containing said differential image; and means for recognizing said second rectangular area as said character writing area when said detected first rectangular area is adjacent to said detected second rectangular area.

7. A document format producing apparatus comprising:

image input means for inputting a plurality of images of written documents respectively having different characters recorded thereon to a document provided with ruled lines and a character writing area where characters are to be recorded;

image processing means for producing a common image common to said plurality of images and a differential image acquired by performing a logical sum of mutually different images in said plurality of images, based on said plurality of images input by said image input means;

character-writing-area detection means for detecting said character writing area based on said common image and said differential image produced by said image processing means;

attribute setting means for setting attributes for said detected character writing area based on said common image and said differential image produced by said image processing means;

format setting means for setting positional information of said detected character writing area and said set attributes as format control information of said written documents in association with each other; and an attribute dictionary having predetermined characters associated with attributes, wherein said attribute setting means recognizes characters in said common image and sets attributes to that character writing area which is adjoining to said character-recognized common image based on a result of character recognition by referring to said attribute dictionary.

8. The document format producing apparatus according to claim 7, further comprising attribute correction means for correcting said set attributes of said character writing area.

* * * * *

UNITED STATES PATENT AND TRADEMARK OFFICE
CERTIFICATE OF CORRECTION

PATENT NO.    : 6,614,929 B1
DATED         : September 2, 2003
INVENTOR(S)   : Yokota It is certified that error appears in the above-identified patent and that said Letters Patent is hereby corrected as shown below:

<u>Title page,</u>
Item [57], ABSTRACT,
Line 6, change "image, a" to -- image, --.

<u>Column 8,</u>
Line 2, change "rectangle" to -- rectangular --.

Signed and Sealed this

Eleventh Day of November, 2003

JAMES E. ROGAN
*Director of the United States Patent and Trademark Office*